United States Patent
Rajagopalan (10) Patent No.: US 7,363,401 B1
(45) Date of Patent: Apr. 22, 2008

(54) METHOD AND APPARATUS FOR CONTROLLING BUS TRANSACTIONS DEPENDING ON BUS CLOCK FREQUENCY

(75) Inventor: Srinivasan Rajagopalan, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 08/990,420

(22) Filed: Dec. 15, 1997

(51) Int. Cl.
*G06F 1/00* (2006.01)
*G06F 5/06* (2006.01)

(52) U.S. Cl. .......................... 710/60; 713/500; 327/276
(58) Field of Classification Search .............. 710/60, 710/107, 118; 713/500, 501; 365/233; 395/550; 370/516; 331/57; 327/153, 276, 277
See application file for complete search history.

(56) References Cited

U.S. PATENT DOCUMENTS

| | | | | |
|---|---|---|---|---|
| 5,008,904 A | * | 4/1991 | Mangelsdorf et al. ...... | 375/356 |
| 5,305,452 A | * | 4/1994 | Khan et al. ................. | 395/550 |
| 5,319,771 A | * | 6/1994 | Takeda ........................ | 395/550 |
| 5,371,880 A | * | 12/1994 | Bhattacharya .............. | 713/400 |
| 5,491,814 A | * | 2/1996 | Yee et al. .................... | 395/550 |
| 5,506,982 A | * | 4/1996 | Hottal et al. ................ | 395/550 |
| 5,535,377 A | * | 7/1996 | Parks .......................... | 395/550 |
| 5,537,581 A | * | 7/1996 | Conary et al. .............. | 395/550 |
| 5,572,718 A | * | 11/1996 | Scriber et al. .............. | 395/555 |
| 5,578,940 A | * | 11/1996 | Dillon et al. ................. | 326/30 |
| 5,588,004 A | * | 12/1996 | Suzuki et al. ............... | 370/516 |
| 5,634,117 A | * | 5/1997 | Conary et al. .............. | 395/556 |
| 5,678,065 A | * | 10/1997 | Lee et al. .................... | 395/550 |
| 5,784,332 A | * | 7/1998 | Zheng et al. ................ | 365/233 |
| 5,802,356 A | * | 9/1998 | Gaskins et al. ............. | 713/500 |
| 5,809,291 A | * | 9/1998 | Munoz-bustamante et al. ........ | 395/556 |
| 5,838,995 A | * | 11/1998 | Chen et al. .................. | 395/880 |
| 5,939,874 A | * | 8/1999 | Duley .......................... | 324/96 |
| 5,961,649 A | * | 10/1999 | Khandekar et al. ......... | 713/400 |
| 6,049,887 A | * | 4/2000 | Khandekar et al. ......... | 713/503 |
| 6,759,884 B2 | * | 7/2004 | Tomita ........................ | 327/277 |
| 2003/0011418 A1 | * | 1/2003 | Miura ......................... | 327/276 |

* cited by examiner

*Primary Examiner*—Mark H. Rinehart
*Assistant Examiner*—Trisha Vu
(74) *Attorney, Agent, or Firm*—Kenyon & Kenyon LLP (57) ABSTRACT

A method and apparatus is presented that can provide first and second windows for driving data onto a bus in dependence on bus clock frequency. In one example, the speed of the bus clock is determined by a component such as a processor. If the bus clock frequency is at a first, relatively high frequency, data is driven onto the bus in an earlier time window (e.g., near the rising edge of the bus clock signal). If the bus clock frequency is at a second, lower frequency, data is driven onto the bus in a second, later time window (e.g., near the center of the high level of the bus clock). Accordingly, the time window for receiving the data driven onto the bus need not be changed (e.g., near the rising edge of the next bus clock signal) allowing components to work effectively with both bus clock frequencies.

12 Claims, 8 Drawing Sheets

METHOD AND APPARATUS FOR CONTROLLING BUS TRANSACTIONS DEPENDING ON BUS CLOCK FREQUENCY

BACKGROUND OF THE INVENTION

The present invention pertains to the controlling of one or more components coupled to a bus. More particularly, the present invention pertains to the changing of operation of a component coupled to a bus in dependence on the bus clock frequency.

In a computer architecture, a processor (e.g. a Pentium®-II processor, Intel Corporation, Santa Clara, Calif.) is typically coupled to a main circuit board (also referred to as a motherboard). The motherboard typically includes electrically conductive traces that allow the processor to be coupled to a variety of components. An example of a computer architecture can be found in the Intel publication "Peripheral Components," pp. 1–9 to 1–10, 1996 (available from McGraw-Hill Book Company). In that architecture, the processor is coupled to a host bus which couples the processor to several "local" components, such as an additional processor, a memory input/output (I/O) controller, and a Host-to-PCI bridge circuit. The Host-to-PCI bridge circuit (e.g., as part of the 82430FX PCIset from Intel Corporation) provides an interface between the host bus and a peripheral component interconnect (PCI) bus (Rev. 2.1, PCI Special Interest Group, Hillsboro, Oreg., 1995). The PCI bus is typically coupled to a number of performance critical devices (i.e., devices that require a fast data throughput) such as a graphics controller and PCI-to-ISA bridge circuit (also provided in the 82430FX PCIset). An Industry Standard Architecture (ISA) bus is typically coupled to devices that are not performance critical such as a standard floppy drive or hard-disc drive.

Devices coupled to the host, PCI, and ISA busses are typically synchronous devices in that they assert signals and receive signals to/from these busses at specific times with reference to a periodic bus clock. For example, a host bus clock source is coupled to each device that is coupled to the host bus. This host bus clock typically runs at a frequency of 60 MegaHertz (MHZ—one million cycles per second) or 66 MHZ. One skilled in the art will appreciate that a clocking signal with a frequency lower than these frequencies can be supplied to the devices, where the devices increase (e.g., through multiplication) the frequency to the desired operating frequency. The internal clock of the processor typically runs at a multiple of the host bus clock frequency. For example, a 200 MHZ Pentium® Pro processor runs at approximately three times the host bus clock frequency of 66 MHZ.

According to the Pentium® Pro Processor Specification (Pentium® Pro Family Developer's Manual, Volume 1: Specifications, 1996, available from Intel Corporation), there is a specific protocol for sending data over the host bus between bus devices. For example, when a device (e.g., a Pentium® Pro processor) seeks to send data onto the host bus to be read by another device (e.g., a memory I/O controller) it must assert (or drive) the signal(s) (e.g., control, address, and/or data signals) onto the bus during a specific time window. With a host bus speed of 66 MHZ, the signal(s) must be driven onto the host bus no earlier than a time $t_{co\text{-}min}$ (e.g., 1.0 nanoseconds) after the rising edge of a bus clock cycle and no later than $t_{co\text{-}max}$ (e.g., 4.5 ns) after the rising edge of a bus cycle. In receiving the signal from the bus, the receiving device must look for and latch the signal during a second time window which is defined as $t_{setup}$ (e.g., 2.5 ns) before the rising edge of the next bus clock cycle and $t_{hold}$ (e.g., 0.0 ns) after this same rising edge.

To improve performance of the overall system architecture, it would be desirable to increase the frequency of the host bus clock, thus increasing the amount (per unit of time) of control, address, and data signals that can be driven and received onto/from the host bus. For example, at a bus speed of 100 MHZ, approximately 50% more of such signals can be transferred over the host bus when compared to 66 MHZ. There are several problems that can occur by unilaterally increasing the host bus clock. For example, in doing so, it is possible that the receiving device will not be able to latch the signal sent to it over the bus, given the timing window limitations present in the specification. This is due, in part, to the limitations of electronic circuits (e.g., switching times) in these devices and clock skew perceived by the sending and receiving devices. Because many computer architectures comprise components that can be removed and replaced, it is possible that a user may attempt to increase the clocking frequency of the host bus after the processor has been updated to a faster operating speed.

In view of the foregoing problems with increasing bus clock speeds, there is a need for a method and apparatus that allows devices to effectively communicate with a bus at multiple bus clock frequencies.

SUMMARY OF THE INVENTION

According to an embodiment of the present invention, an apparatus is provided for writing data to a bus including a delay circuit adapted to receive data and transmit the data to a bus. The delay circuit is adapted to delay transmitting this data to the bus in dependence on a bus clock frequency for the bus.

DETAILED DESCRIPTION

Figure 1:
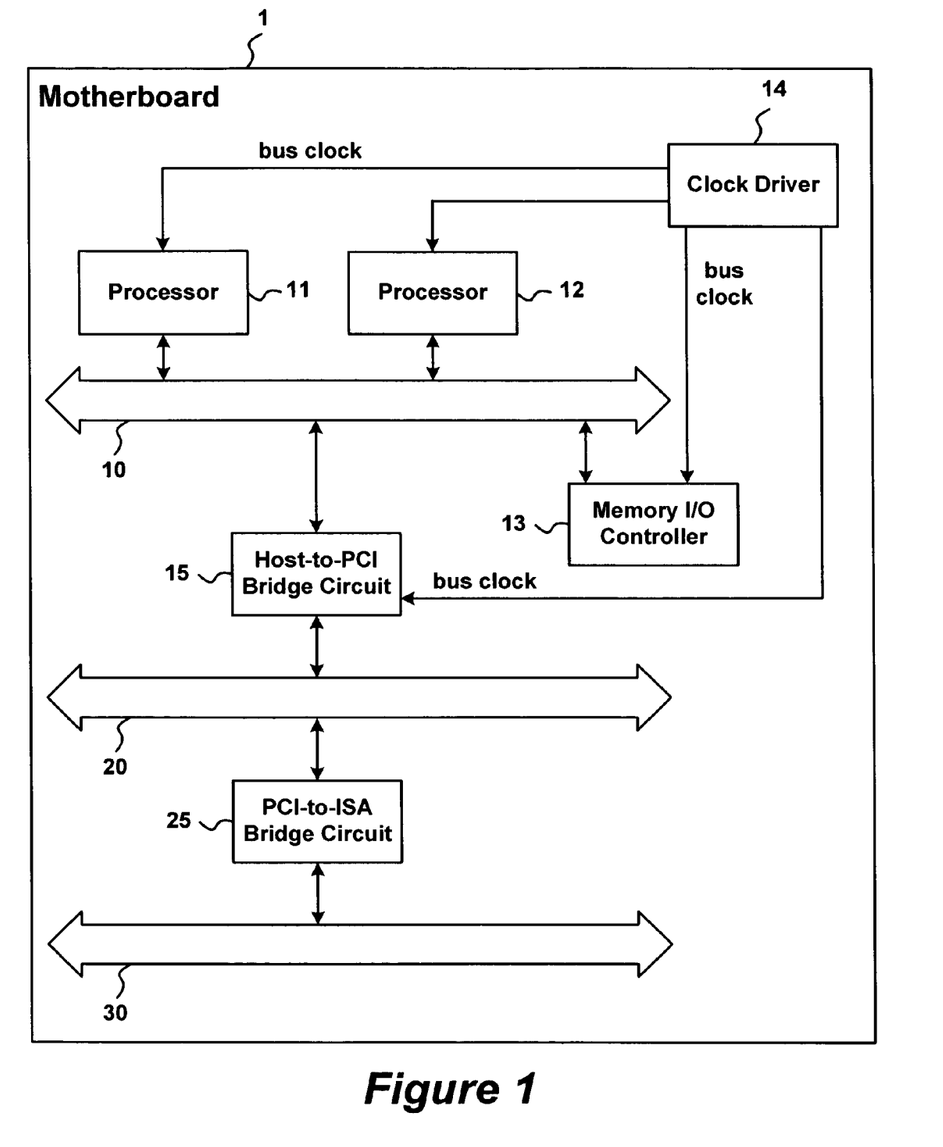
FIG. 1 is a block diagram of a computer architecture using an embodiment of the present invention.

Referring to FIG. 1, a block diagram of a computer architecture is shown employing an embodiment of the present invention. Though the present invention is described with respect to the operation of the host bus, one skilled in the art will appreciate that the present invention can be used in a variety of other busses including the PCI and ISA busses. In FIG. 1, a host bus 10 is provided (e.g., as part of motherboard 1) which couples together a variety of components, such as a first processor 11, a second processor 12, a memory I/O controller 13 and a host-to-PCI bridge circuit 15. In this embodiment, processors 11 and 12 are Pentium® Pro processors that plug into motherboard 1. A clock driver 14 is provided as part of motherboard 1 and supplies a "bus clock" signal to each of the components coupled to host bus 10. In the computer architecture of FIG. 1, the Host-to-PCI bridge circuit 15 provides an interface between host bus 10 and a PCI bus 20. A PCI-to-ISA bridge circuit 25 provides an interface between PCI bus 20 and an ISA bus 30.

Figure 2A:
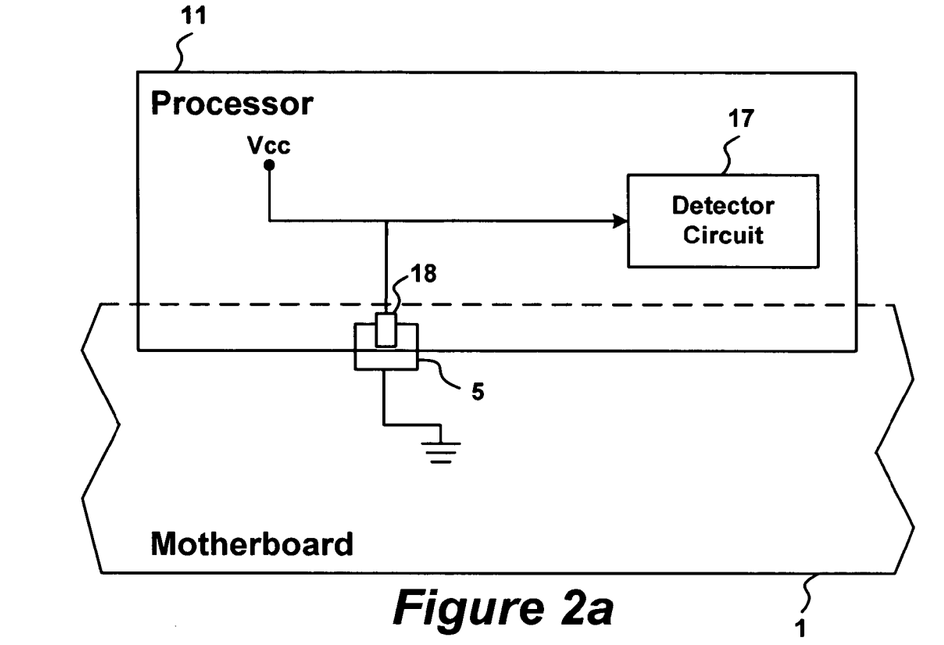
FIGS. 2a–b are block diagram showing the connection of a processor to a motherboard including a detector circuit according to an embodiment of the present invention.

According to an embodiment of the present invention, host bus 10 operates at one of two bus clock frequencies: 66 MHZ or 100 MHZ. In current motherboards designed for receiving the Pentium® Pro processor (and including a host bus operating at 66 MHZ) the pin socket for pin SELFSB (Select Front Side Bus) in the processor is well grounded. Referring to FIG. 2a, a block diagram showing the connection of this pin to processor 11 is shown for a motherboard including a host bus operating at 66 MHZ). Pin SELFSB (detecting pin 18) is coupled to socket 5 of motherboard 1 as well as collector voltage supply $V_{cc}$ and a detector circuit 17. Because socket 5 is well grounded, a logic "0" would appear at the input of detector circuit 17.

Figure 2B:
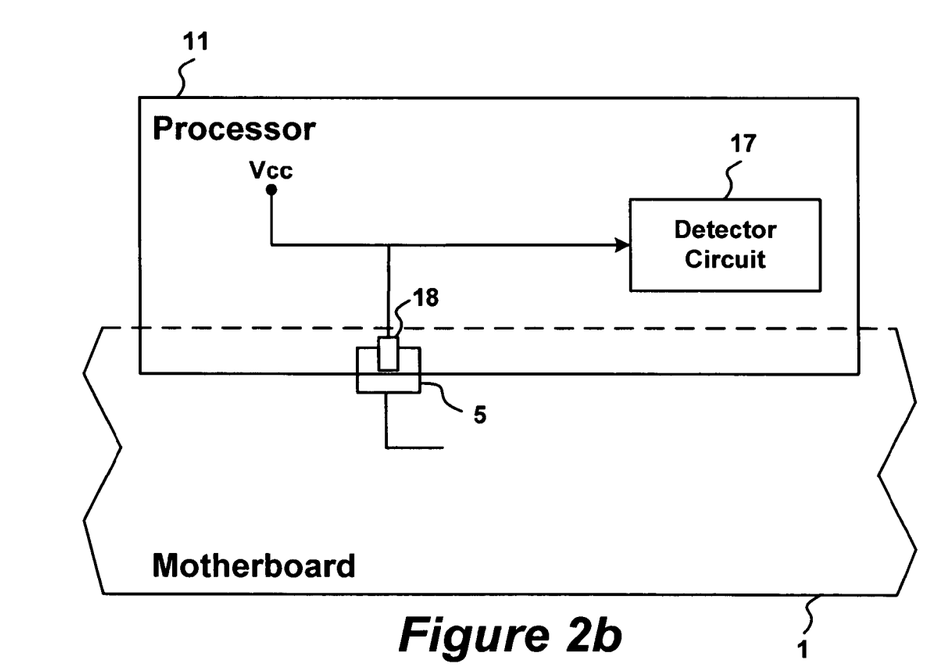

According to an embodiment of the present invention, for a motherboard including a host bus that operates at 100 MHZ, socket 5 is not grounded. Referring to FIG. 2b, a block diagram showing the connection of this same pin to the motherboard is shown. Since socket 5 is not grounded, voltage supply $V_{cc}$ provides a logic "1" input to detector circuit 17.

Figure 3:
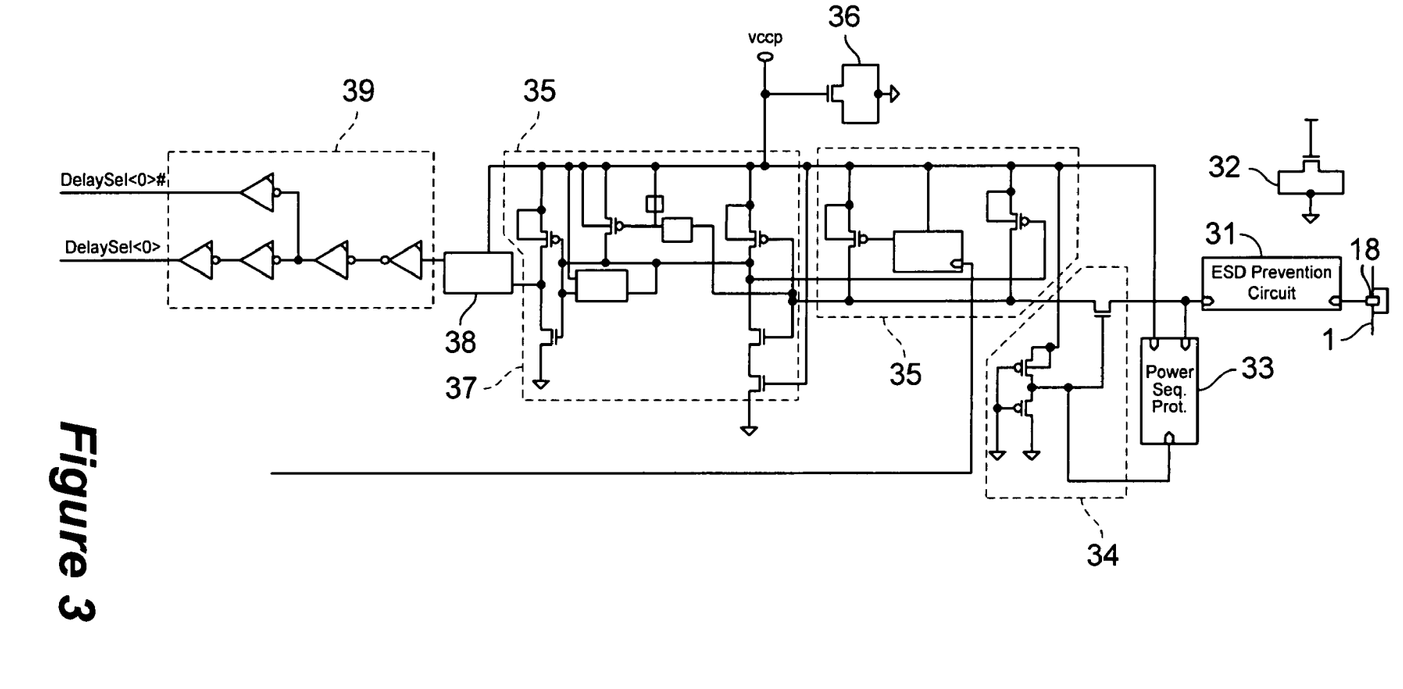
FIG. 3 is a circuit diagram of a detector circuit according to an embodiment of the present invention.

Referring to FIG. 3, a circuit diagram of detector circuit 17 is shown according to an embodiment of the present invention. A circuit for detecting the presence of a logic "1" or "0" value is considered to be well known in the art, and the circuit of FIG. 3 is just one example. The input signal from pin 18 is first provided to an electrostatic discharge (ESD) prevention circuit 31. A decoupling capacitor 32 can be provided as is known in the art. A power sequencing protection circuit 33 is provided to keep the gate-to-source voltage for the detector circuit below a maximum value (e.g., 2.5 volts in this embodiment). Circuit 34 is a voltage divider circuit that lowers the input signal voltage so that its maximum does not exceed the periphery collector voltage $V_{ccp}$. Circuit 35 is a leaker circuit that keeps a logic "1" signal at the $V_{ccp}$ level and does not affect a logic "0" signal. Again, as is known in the art, a decoupling capacitor can be provided coupled to the $V_{ccp}$ supply. Circuit 37 is a trip-point detector which generates either a logic "0" voltage signal or a logic "1" voltage signal depending on the input. Circuit 38 is a level shifter which converts the voltage between the $V_{ccp}$ value and the core $V_{cc}$ value. Finally, circuit 39 provides amplification for the signal using a plurality of inverter circuits and generates an inverted and non-inverted logical value for the condition of pin 18 (shown here as DelaySel<0> and DelaySel<0>#). In this embodiment of the invention, a logic "1" indicates a 66 MHZ host bus clock frequency and a logic "0" indicates a 100 MHZ host bus clock frequency. One skilled in the art will appreciate that the logic signals for detecting pin 18 can be reversed in that logic "1" indicates a 66 MHZ host bus clock and a logic "0" indicates a 100 MHZ host bus clock.

Figure 4:
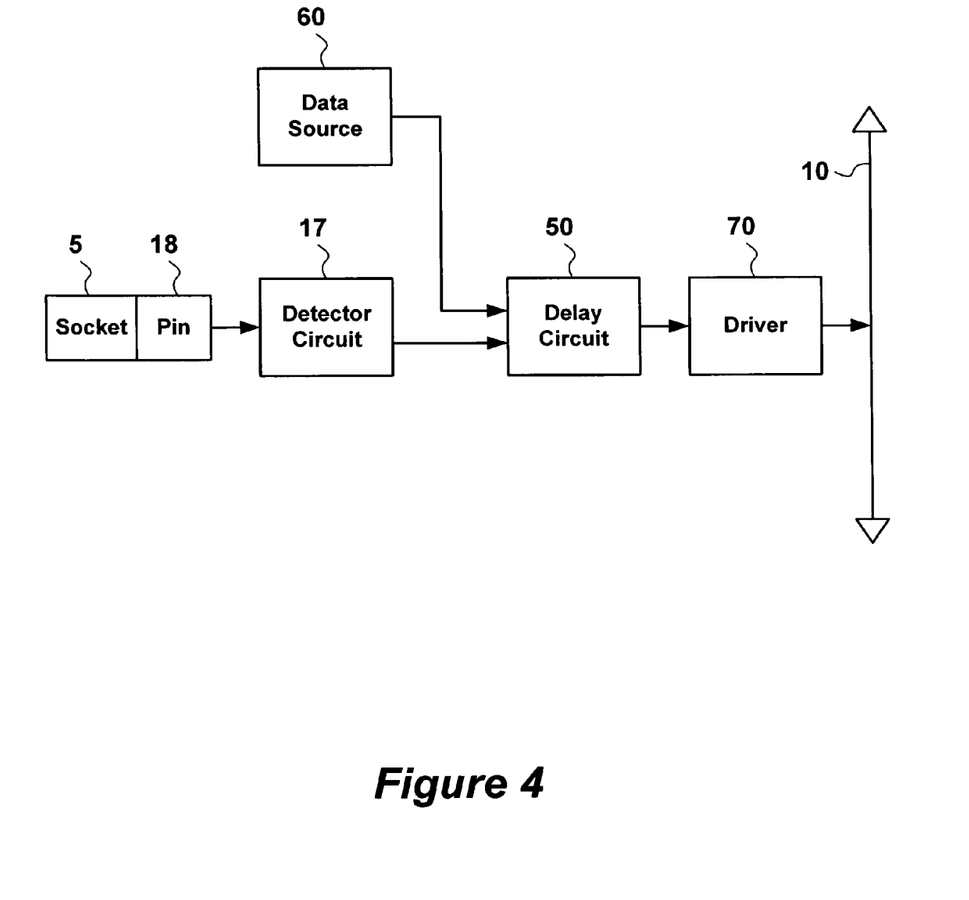
FIG. 4 is a block diagram of a circuit for driving data onto a bus in dependence on clock frequency according to an embodiment of the present invention.

Referring to FIG. 4, a simplified block diagram of an embodiment of the present invention is shown. As described above, detector circuit detects the logic value from pin 18 and socket 5 to determine whether the host bus of the motherboard is operating at 66 MHZ or 100 MHZ. This value is provided to a delay circuit 50 which receives data (as used herein the term "data" refers to control, address, data, and any other signals asserted to a bus) from a data source 60 to be driven on host bus 10 via driver 70 (which may include so-called predriver circuitry, as well). Delay circuit 50 determines what delay if any should be applied to the data from data source 60 before driving it on bus 10.

Figure 5A:
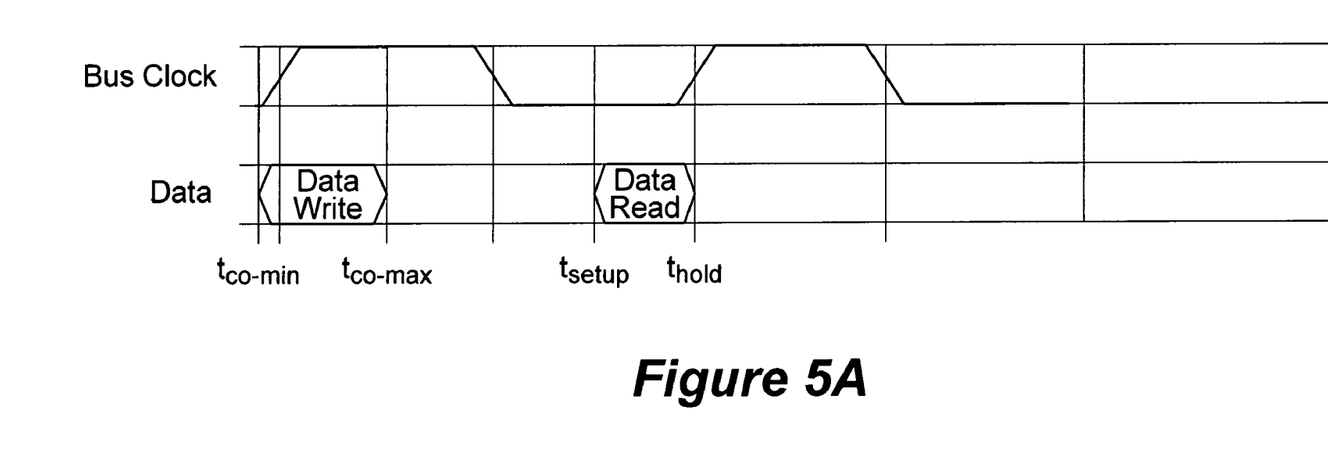
FIGS. 5a–b are timing diagrams showing the relationship between a bus clock signal and the driving and receiving of data onto/from a bus using the circuit of FIG. 4.
Figure 5B:
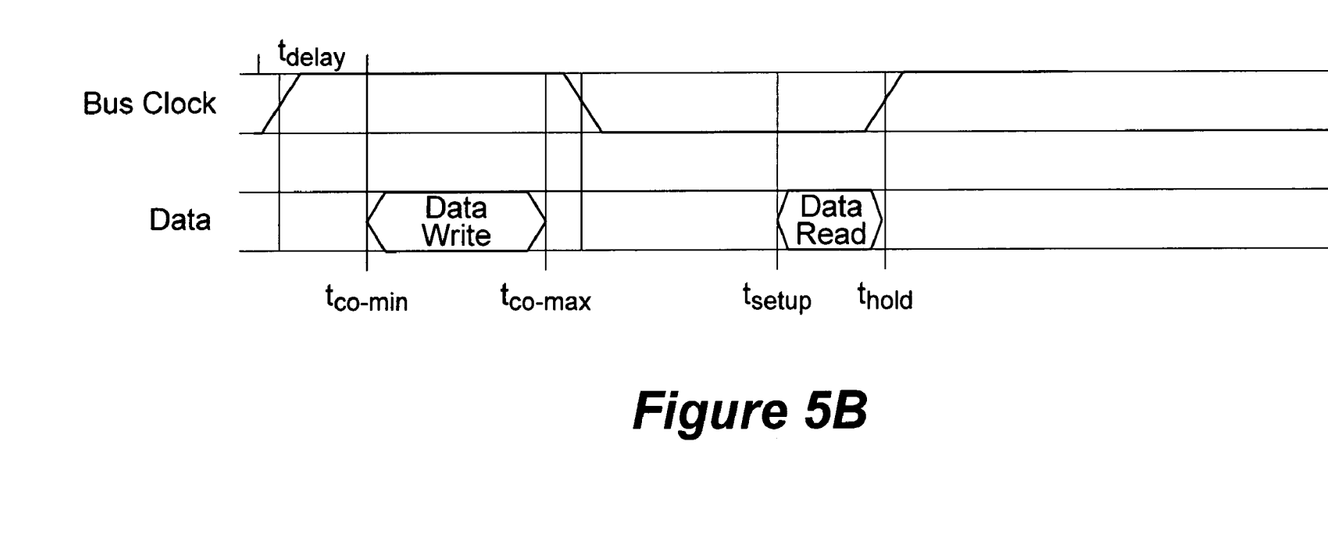

The effect of delay circuit 50 is shown in the timing diagram of FIGS. 5a and 5b. These figures show the relationship between bus clock and data signals and are not to scale. Referring to FIG. 5a, a timing diagram for the motherboard having a host bus speed of 100 MHZ is shown. In this embodiment of the present invention, data from data source 60 (FIG. 4), from first processor 11 (FIG. 1), for example, is not delayed and is written to (i.e., driven onto) the bus at the earliest possible time (e.g., in a first time window as determined by the variables $t_{co\text{-}min}$ and $t_{co\text{-}max}$) referenced to the rising edge of the bus clock signal (a typical value for $t_{co\text{-}min}$ would be −0.2 ns and for $t_{co\text{-}max}$ would be 3.6 ns). The data is read from the bus by memory I/O controller 13 (FIG. 1), for example, at the same time as noted in the Pentium® Pro Specification (66 MHZ bus speed) as determined by the window $t_{setup}$ to $t_{hold}$ referenced to the rising edge of the next bus clock signal. The elapsed time between these two windows is sufficient to ensure that the data written by processor 11 on the rising edge of the bus clock will be properly read on the next rising edge of the bus clock by memory I/O controller 13.

Referring to FIG. 5b, the bus clock operates at a slower second frequency of 66 MHZ. Accordingly, delay circuit 50 (FIG. 4) acts to delay the driving of data from data source 60 (FIG. 4) onto bus 10 by an amount $t_{delay}$. As seen in FIG. 5b, after the time $t_{delay}$ has elapsed referenced to the rising edge of the bus clock signal, data is written to or driven onto bus 10 (FIG. 1) in a second time window defined by $t_{co\text{-}min}$ and $t_{co\text{-}max}$. Data is read from the bus in the window $t_{setup}$ and $t_{hold}$ which are preferably the same values as in the example of FIG. 5a.

Several results are seen with the embodiment of the present invention described so far. First, if a user were to take a motherboard with a host bus operating at 66 MHZ and increase the bus clock frequency to 100 MHZ, detector circuit 17 would detect a 66 MHZ motherboard and would delay the driving of data onto the host bus. Because the bus clock is at 100 MHZ, there is insufficient time between the "data write" window and the "data read" window to allow the data to be properly read (e.g., by memory I/O controller 13). Second, by driving the data onto the bus earlier in the bus clock cycle of the 100 MHZ bus clock signal, there is sufficient time for the data to be read at the next bus cycle, while there may not be enough time if the same data were to be written in the time defined in the 66 MHZ Pentium® Pro Specification.

Figure 6:
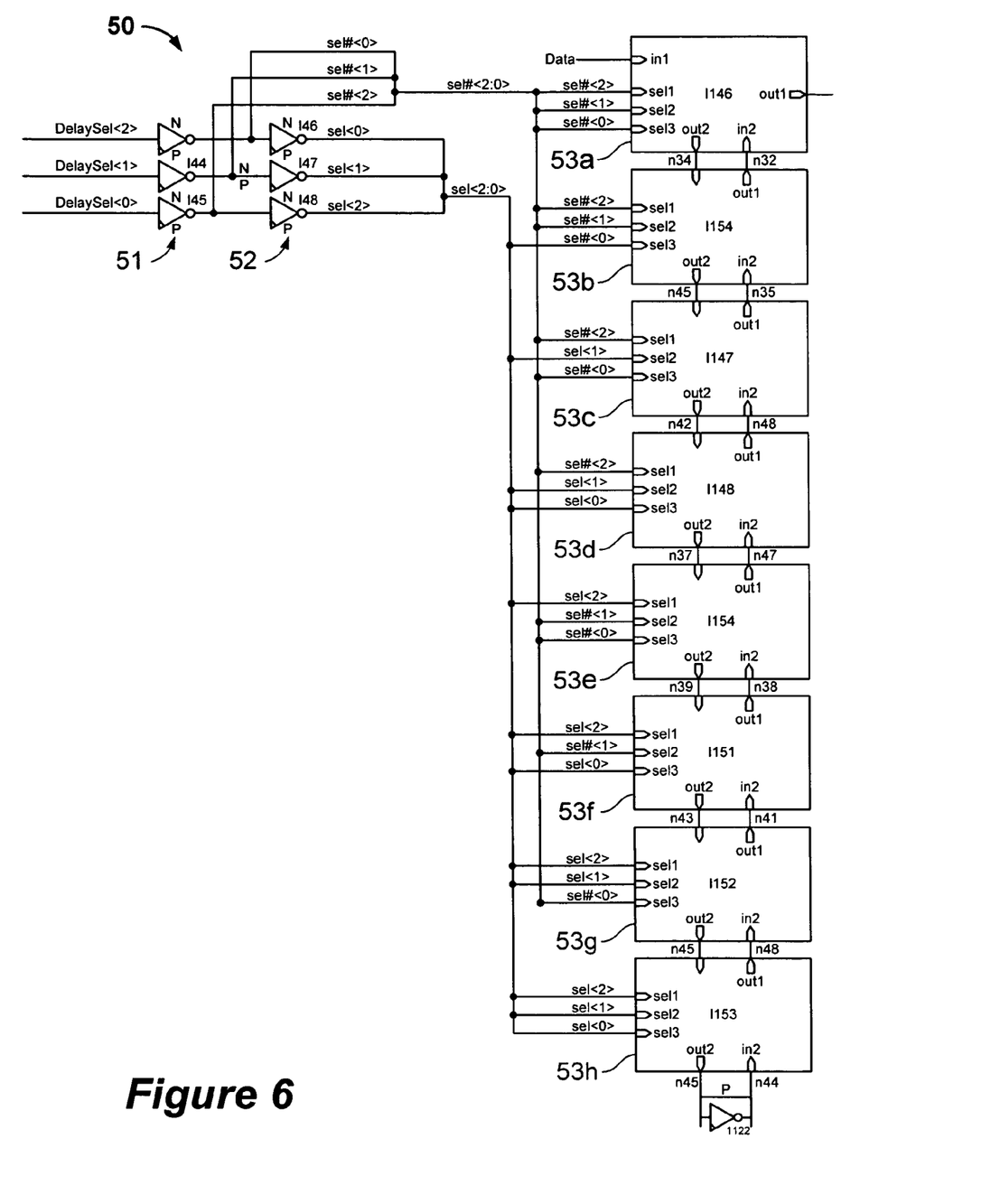
FIG. 6 is a circuit diagram of the delay circuit of FIG. 4.

Referring to FIG. 6, a block diagram of delay circuit 50 is shown. A first set of inverters 51 is provided that receives the DelaySel<0> signal from detector circuit 17. The remaining input signals, DelaySel<1> and DelaySel<2>, are set to a logic "0" value and are not used in this embodiment of the present invention but can be used to create further delays for data signals driven onto the bus as described further below. A second set of inverters 52 is provided coupled to the outputs of inverters 51. As is known in the art, a decoupling capacitor 54 can be provided to decouple the circuit of FIG. 6 from other circuits (e.g., in processor 11). The outputs of the first and second set of inverters 51, 52 are supplied as inputs to a plurality of delay logic devices 53a–h. A first delay logic device 53a also receives the data input from data source 60 (FIG. 4). Delay logic device 53a–h act to delay the driving of data from data source 60 in dependence on the values for DelaySel<0–2>.

Figure 7:
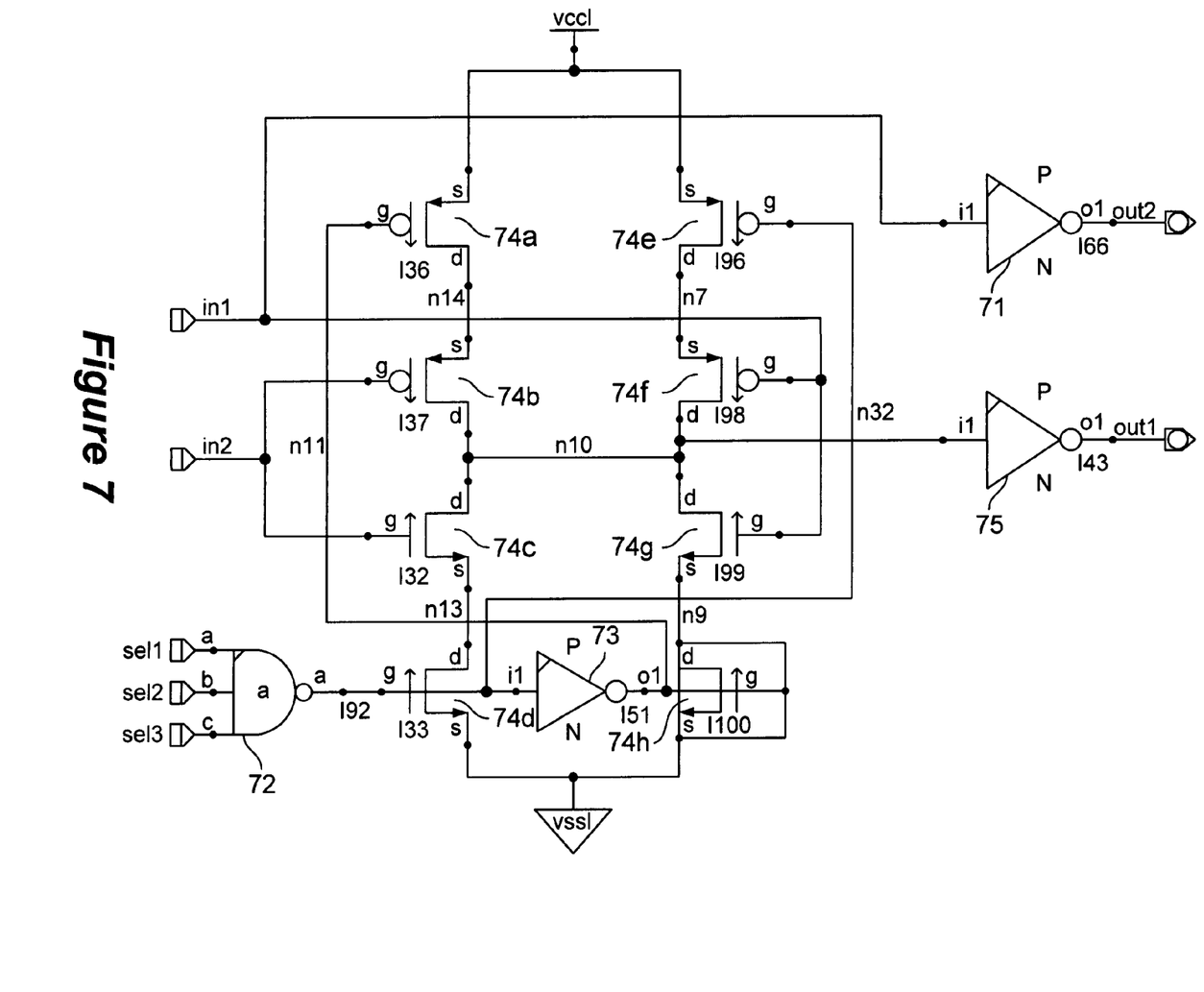
FIG. 7 is a block diagram of the first delay logic circuit of FIG. 6.

Referring to FIG. 7, a circuit diagram of first delay logic device 53a is shown according to an embodiment of the present invention. Data to be driven onto the bus is input at "in1" and is supplied directly to inverter 71. The output of inverter 71 appears at "out2" and is supplied to a second delay logic device 53b ("in2" and "out2" are discussed in further detail with reference to FIG. 8). The inverted values of DelaySel<2–0> appear at the input of NAND gate 72 as signals "sel1," "sel2," and "sel3," respectively. Because DelaySel<2> and DelaySel<1> are set to 0 in this embodiment, NAND gate 72 works to invert the value, DelaySel<0>, and supply this value to the gate input of an n-field-effect transistor (nFET) 74d and the gate input of pFET 74f. The inverted output of NAND gate 72 (by inverter 73) is supplied to the gate input of nFET 74h and the gate input of pFET 74a. The data at "in1" is supplied to the gate input of pFET 74f and the gate input of nFET 74g. In operation, if DelaySel<0> has a logic "0" value (indicating a 100 MHZ host bus clock), then nFET 74d and pFET 74a are turned off and nFET 74h and pFET 74e are turned on. At this point pFET 74f and nFET 74g act as an inverter for the data appearing at "in1" (i.e., one FET is turned off while the other is turned on) so that the inverted value of "in1" appears at the input of inverter 75. Accordingly, if DelaySel<0> is set to a 0 value, then data appearing at "in1" passes directly to "out1."

If DelaySel<0> has a logic "1" value (indicating a 66 MHZ host bus clock), then nFET 74d and pFET 74a are turned on and pFET 74e and nFET 74h are turned off. At this point pFET 74b and nFET 74c act as an inverter for the data appearing at "in2" so that the inverted value of "in2" appears at the input of inverter 75. Accordingly, if DelaySel<0> is set to a 1 value, then data appearing at "in2" passes directly to "out1."

Figure 8:
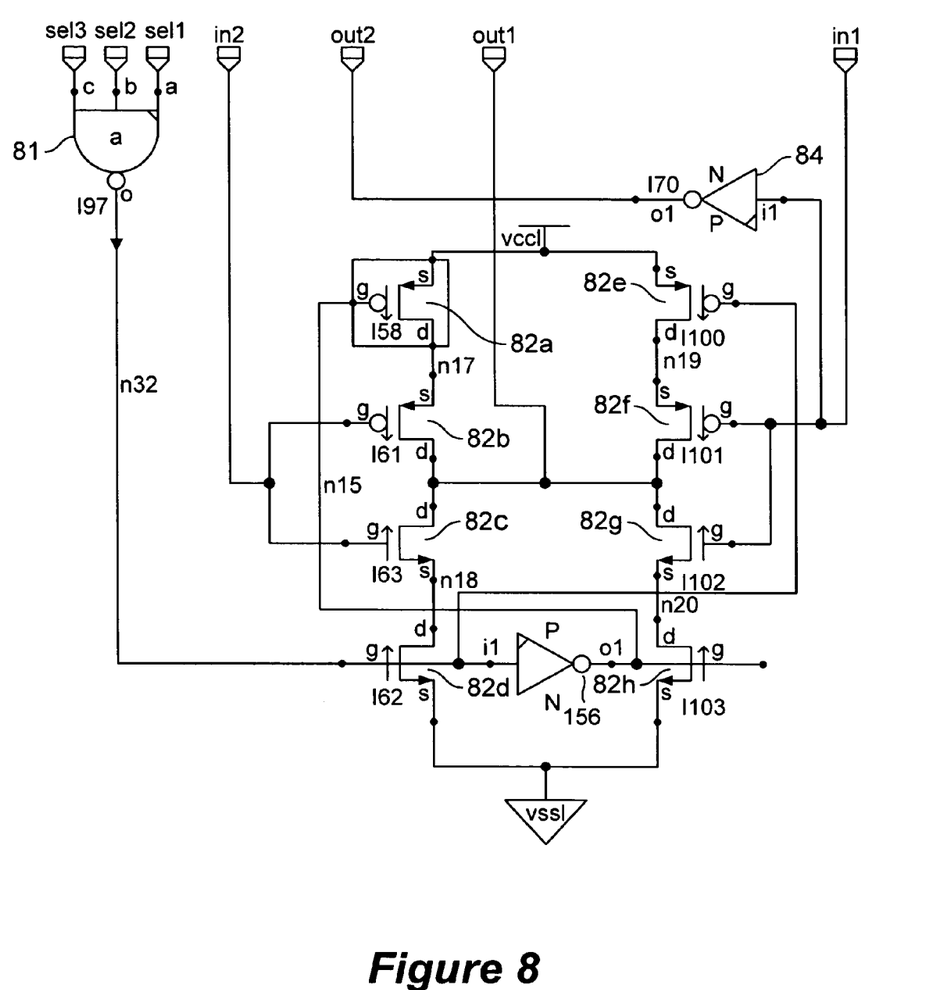
FIG. 8 is a block diagram of the second delay logic circuit of FIG. 6.

Referring to FIG. 8, a circuit diagram of second delay logic device 53b is shown. The data appearing at "out2" in first delay logic device 52b is supplied as the "in1" input in FIG. 8. Data appearing at "in1" is further supplied to inverter 84 and appear as output "out2" coupled to third delay logic device 53c (FIG. 6). In this embodiment, the uninverted value for DelaySel<0> is supplied as the value "sel3" and "sel1" and "sel2" are logical 1 values at the inputs of NAND gate 81. If DelaySel<0> has a "1" value (indicating a 66 MHZ host bus clock), then the output of NAND gate 81 would be "0" turning nFET 82d off and pFET 82e on; pFET 82a is turned off and nFET 82h is turned off via inverter 83. At this point, pFET 82f and nFET 82g act as an inverter for the data appearing at "in1" so that the inverted value of "in1" appears at the output "out1." Accordingly, if DelaySel<0> is set to a 1 value, then data appearing at "in1" passes to "out 1," with delay. The data at "out1" in FIG. 8 is supplied to the "in2" input in FIG. 7 and is supplied as the "out1" signal in FIG. 7 (i.e., the data is then driven onto the bus).

Referring back to FIG. 8, if any value appears at the "sel1–3" input lines other than all logic "1" values, then nFET 82d and pFET 82a would be turned on and nFET 82h and pFET 82e would be turned off. As a result, pFET 82b and nFET 82c act as an inverter circuit on the data appearing at "in2" which is supplied by third delay logic device 53c.

In the example described above, first and second delay logic devices act to add a delay to data from data source 60 in dependence on the value at DelaySel<0> (which indicates bus clock frequency). The result, as seen in the timing diagram of FIGS. 5a–b, is that for the 100 MHZ host bus clock, the data is written earlier in the bus cycle as compared to the 66 MHZ host bus clock. Accordingly, with the present invention, first and second windows are provided for driving data onto the host bus in dependence on bus clock frequency. Delay logic devices 53c–h have a construction similar to what is shown in FIGS. 7 and 8. Using all three DelaySel signals, all eight delay logic devices 53a–h can be used to create eight different windows for driving data onto a bus in dependence on bus clock frequency.

Although several embodiments are specifically illustrated and described herein, it will be appreciated that modifications and variations of the present invention are covered by the above teachings and within the purview of the appended claims without departing from the spirit and intended scope of the invention. For example, one skilled in the art will appreciate that processor 11 and memory I/O controller 13 are only examples of devices that are coupled to a host bus. The present invention can be applied to other devices and other busses to achieve the same effects. Also, though the present invention has been described with respect to busses operating at 66 MHZ and 100 MHZ, the present invention can be applied to busses operating at other frequencies as well.

What is claimed is:

1. An apparatus comprising:
   a detector circuit to detect whether a bus clock frequency has a first value or a second, higher value; and,
   a delay circuit to transmit data to the bus in a first time window with respect to a bus clock cycle when the bus clock frequency has the first value and to transmit data to the bus in a second, delayed time window with respect to the bus clock cycle when the bus clock frequency has the second value, the delay circuit including:
     a first delay logic device to transmit the data to the bus when the bus clock frequency has the first value and to transmit the data to a second delay logic device when the bus clock frequency has the second value, the second delay logic device to add delay to the data and to transmit delayed data back to the first delay logic device for transmission to the bus.

2. The apparatus of claim 1 wherein the delay circuit is to greater delay transmitting data to the bus when the bus clock frequency has the second value compared to when the bus clock frequency has the first value.

3. The apparatus of claim 1 wherein the detector circuit is to be coupled to a socket in a motherboard coupled to the bus.

4. The apparatus of claim 1 wherein the detector circuit is to be coupled to a socket in a motherboard, the socket being coupled to the bus.

5. The apparatus of claim 1 wherein the bus is a host bus, the first value is 100 MHZ and the second value is 66 MHZ.

6. A method comprising:
   detecting the bus clock frequency for a bus, the bus clock frequency having a first value or a second, lower value;
   receiving data at a delay circuit; and
   transmitting the data to the bus in a first time window with respect to a bus clock cycle when the bus clock frequency has the first value and transmitting the data to the bus in a second, delayed time window with respect to the bus clock cycle when the bus clock frequency has the second value, the transmitting including:
     receiving data to be transmitted to the bus at a first delay logic device;
     transmitting the data to the bus when the bus clock frequency has the first value and transmitting the data to a second delay logic device when the bus clock frequency has a second value; and adding delay to the data at the second delay logic device; and transmitting the delayed data back to the first delay logic device for transmission to the bus.

7. The method of claim 6 wherein in the transmitting step, the amount of delay is greater when the bus clock frequency has the second value compared to when the bus clock frequency has the first value.

8. A system comprising:

a bus; and, a processor to detect whether a bus clock frequency has a first value or a second, higher value and to transmit data to the bus in a first time window with respect to a bus clock cycle when the bus clock frequency has the first value and to transmit data to the bus in a second, delayed time window with respect to the bus clock cycle when the bus clock frequency has the second value, the processor including:

a first delay logic device to transmit the data to the bus when the bus clock frequency has the first value and to transmit the data to a second delay logic device when the bus clock frequency has the second value, the second delay logic device to add delay to the data transmitted and to transmit delayed data back to the first delay logic device for transmission to the bus.

9. The system of claim 8 wherein the processor is to greater delay transmitting data to the bus when the bus clock frequency has the second value compared to when the bus clock frequency has the first value.

10. The system of claim 8 wherein the processor is to transmit data to the bus in a first time window with respect to a bus clock cycle when the bus clock frequency has the first value and is to transmit data to the bus in a second delayed time window with respect to the bus clock cycle when the bus clock frequency has the second value.

11. The system of claim 8 further comprising a motherboard coupled to the bus and having a socket coupled to the processor.

12. The system of claim 8 wherein the bus is a host bus, the first value is 100 MHZ and the second value is 66 MHZ.

* * * * *